US010476371B2

(12) United States Patent
George

(10) Patent No.: US 10,476,371 B2
(45) Date of Patent: Nov. 12, 2019

(54) METHOD FOR CONTROLLING AT LEAST TWO THREE-PHASE POWER CONVERTERS WITH ASYNCHRONOUS PULSE-WIDTH MODULATION

(71) Applicant: GE Energy Power Conversion Technology Ltd, Rugby, Warwickshire (GB)

(72) Inventor: Benoit George, Essone (FR)

(73) Assignee: GE ENERGY POWER CONVERSION TECHNOLOGY LTD, Warwickshire (GB)

( * ) Notice: Subject to any disclaimer, the term of this patent is extended or adjusted under 35 U.S.C. 154(b) by 0 days.

(21) Appl. No.: 15/805,645

(22) Filed: Nov. 7, 2017

(65) Prior Publication Data

US 2018/0131264 A1 May 10, 2018

(30) Foreign Application Priority Data

Nov. 7, 2016 (FR) ..................................... 16 60726

(51) Int. Cl.
| | |
|---|---|
| *H02M 1/12* | (2006.01) |
| *H02M 7/493* | (2007.01) |
| *H02M 7/5395* | (2006.01) |
| *H02M 7/04* | (2006.01) |
| *H02M 7/44* | (2006.01) |

(52) U.S. Cl.
CPC ............... *H02M 1/12* (2013.01); *H02M 7/04* (2013.01); *H02M 7/44* (2013.01); *H02M 7/493* (2013.01);
(Continued)

(58) Field of Classification Search
CPC .......... H02M 1/12; H02M 1/126; H02M 7/00; H02M 7/02; H02M 7/04; H02M 7/42;
(Continued)

(56) References Cited

U.S. PATENT DOCUMENTS 6,058,031 A * 5/2000 Lyons .................. H02M 7/487
363/132

FOREIGN PATENT DOCUMENTS

EP    0 913 918 A2    5/1999

OTHER PUBLICATIONS

Beechner, T., and Sun, J., "Harmonic Cancellation under Interleaved PWM with Harmonic Injection," IEEE Conference on Power Electronics Specialists, pp. 1515-1521 (Jun. 15-19, 2008).
(Continued)

*Primary Examiner* — Yusef A Ahmed
*Assistant Examiner* — Carlos O Rivera-Perez
(74) *Attorney, Agent, or Firm* — Wood IP LLC

(57) ABSTRACT

A method for controlling at least two three-phase power converters with asynchronous pulse-width modulation. The method further comprises the following steps: for each phase of each converter, the characteristics of the signals used to generate the modulating signal and carrier signal of each control signal of each phase of each converter are determined, for each converter, a phase shift is inserted between the carrier signals used to generate the phase control signals of the converter, for each phase, a phase shift is inserted between the carrier signals used to generate the control signals of the converters, for each phase of each converter, a pulse-width modulation control signal by intersection is determined resulting from the intersection of a modulating signal and a carrier signal, and the control signals are transmitted to the converters.

6 Claims, 5 Drawing Sheets

(52) U.S. Cl.
CPC .... H02M 7/5395 (2013.01); *H02M 2001/123* (2013.01)

(58) Field of Classification Search
CPC .......... H02M 7/44; H02M 7/48; H02M 7/493; H02M 2001/0067–008; H02M 2001/0083; H02M 2001/009; H02M 2001/123; H02M 3/1584; H02M 3/1586; H02M 2007/4815; H02M 2007/4822; H02M 7/49; H02M 7/5395; H02M 3/1582; H02M 3/285; H02M 3/33561; H02J 3/38; H02J 3/46
USPC .......... 363/15–21.03, 34–37, 39–43, 65–72, 363/95–98, 123, 131–134; 323/205–219, 323/222–226, 268, 269, 271–275, 280, 323/282–285, 351, 910; 307/82, 307/125–131; 318/599, 400.3, 800; 375/237–239; 327/129–140, 172–178
See application file for complete search history.

(56) References Cited

OTHER PUBLICATIONS

Ewanchuk, J., et al., "A Five/Nine-Level Twelve-Switch Neutral Point Clamped Inverter for High Speed Electric Drives," IEEE Energy Conversion Congress and Exposition, pp. 2333-2340 (Sep. 12-16, 2010).

Kimball, J.W., and Zawodniok, M.,"Reducing Common-Mode Voltage in Three-Phase Sine-Triangle PWM With Interleaved Carriers," IEEE Transactions on Power Electronics, vol. 26, No. 8, pp. 2229-2236 (Aug. 2011).

Preliminary Search Report and Written Opinion issued in connection with corresponding FR Application No. 1660726 dated Aug. 3, 2017.

Extended European Search Report and Opinion issued in connection with corresponding EP Application No. 17197906.5 dated Mar. 14, 2018.

\* cited by examiner

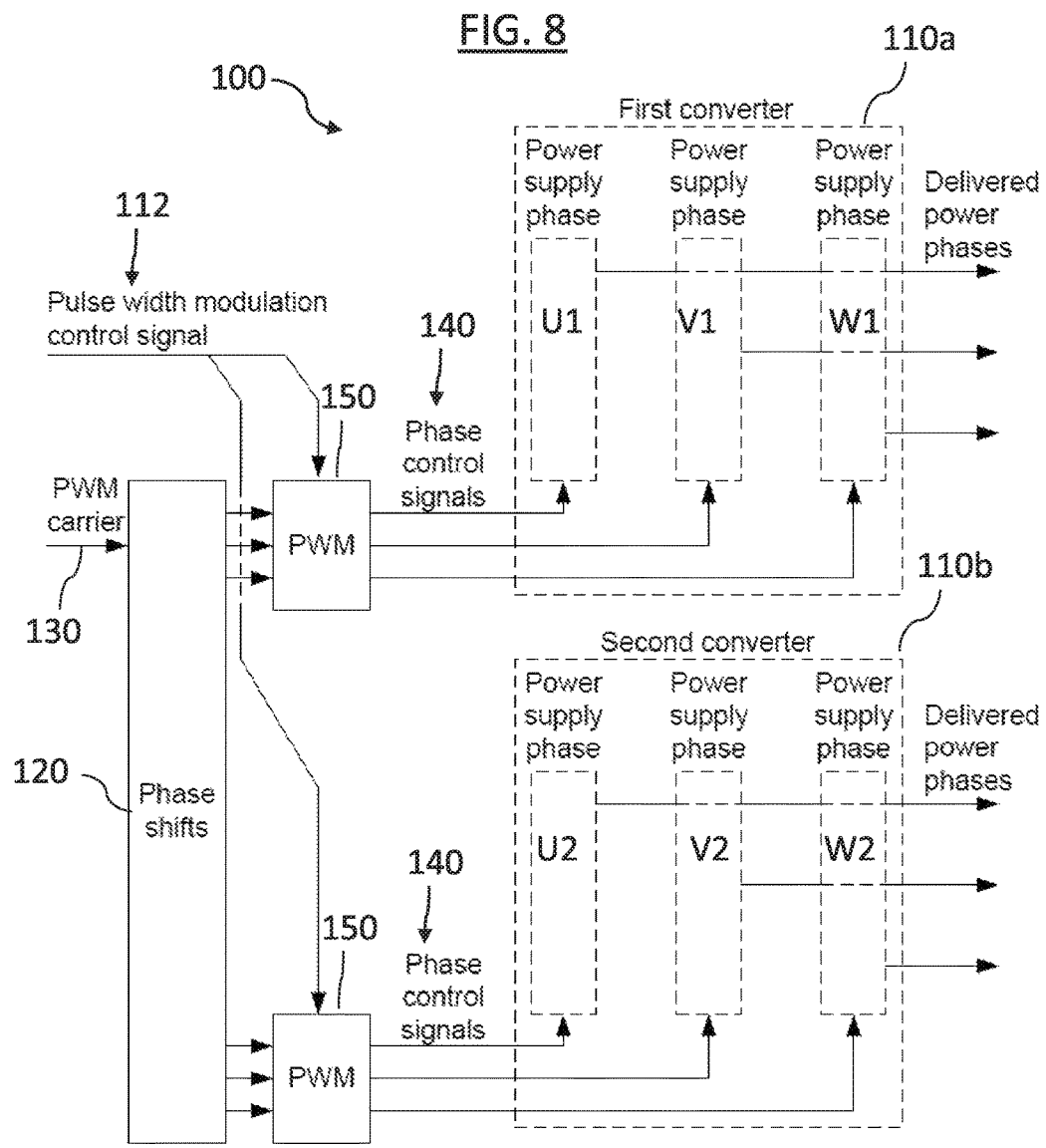

METHOD FOR CONTROLLING AT LEAST TWO THREE-PHASE POWER CONVERTERS WITH ASYNCHRONOUS PULSE-WIDTH MODULATION

FIELD OF INVENTION

The technical field of in an embodiment the conversion of electrical power and, more particularly, the generation of control signals for such power converters.

BACKGROUND OF THE INVENTION

Three-phase electrical motors are powered electrically by power converters, also known as inverters, which transform DC voltage, generally originating from an onboard battery, into AC voltage for each phase of the motor.

In other cases, the power converters modify an AC or DC input voltage into an AC or DC output voltage respectively having an increased or decreased voltage.

In certain applications, a plurality of power converters can be used in parallel to provide increased power.

In that case, asynchronous control signals can be used with pulse-width modulation. The control signals are termed asynchronous because their frequency does not depend on rotation frequency of the electrical motor supplied by the converters.

Examples of the prior art of such control signals are Toggle-type control signals or H3-type control signals. Toggle-type control signals allow startup losses to be minimized, while H3-type control signals are optimized for operation of the motors above 40% of their maximum rotational speed.

According to the prior state of the art, the asynchronous PWM control signals of each phase of the converters are derived from in-phase carrier signals.

The PWM H3 and Toggle signals are intersecting PWM signals, i.e. PWM signals resulting from the intersection of a modulating signal, representing the desired signal by a carrier signal of the sawtooth signal type.

FIG. 1 illustrates the modulating signal of a PWM H3 signal for a phase of a power converter and its components;
FIG. 2 shows the generation of the PWM signal by intersection of the modulating signal and the carrier signals; and
FIG. 3 shows the PWM signal thus obtained.

As shown in FIG. 1, the modulating signal of the PWM H3 signal marked 1 is derived from the sum of a fundamental sinusoidal signal at the frequency $F_{pwm}$ marked 2 and a third-harmonic signal also of the sinusoidal type at the frequency $F_{pwm}/3$ marked 3. The amplitude selected in this example for the third-harmonic signal is equal to ⅙th of the amplitude of the fundamental signal. However, other amplitudes may also be selected.

FIG. 2 shows the intersection of the modulating signal 1 with a first sawtooth carrier signal 4a at the frequency $F_{pwm}$ for the positive amplitudes, and with a second sawtooth carrier signal 4b at the frequency $F_{pwm}$ for the negative amplitudes, where the two carrier signals are synchronous. FIG. 3 shows the PWM signal resulting from this intersection.

The control signal PWM H3 has the advantage of an output power of the power converter receiving the PWM signal generated from this modulating signal that is greater than the power of a power converter controlled by a PWM signal according to the prior state of the art.

FIG. 4 illustrates the modulating signal of a PWM Toggle signal for a phase of a power converter and its components;
FIG. 5 shows the generation of the PWM signal by intersection of the modulating signal and the carrier signals; and
FIG. 6 shows the PWM signal thus Obtained.

As shown in FIG. 4, the modulating signal of the PWM Toggle signal marked 6 is derived from the sum of a sinusoidal signal at the frequency $F_{pwm}$ marked 7 and a square-wave signal at the frequency $F_{pwm}$ marked 8.

In the example given, the amplitude of the square-wave signal is 0.5. However, other amplitudes may also be used.

FIG. 5 shows the intersection of the modulating signal 6 of the PWM Toggle signal with a first sawtooth carrier signal marked 9a at the frequency $F_{pwm}$ for the positive amplitudes, and with a second sawtooth carrier signal 9b, also at the frequency $F_{pwm}$, for the negative amplitudes, where the two carrier signals are in phase opposition. FIG. 6 shows the PWM signal marked 10 resulting from this intersection.

However, the use of asynchronous control signals to control parallel power converters can generate specific, potentially negative effects such as the appearance of differential harmonics and zero-sequence harmonics.

In the current state of the art, such effects can be minimized only by using massive inductors and an interphase transformer reactor (ITR). This results in substantially large dimensions and weight of the power conversion system as a whole.

There is thus a need for more efficient power converter control in order to reduce the size and weight of the inductors and the interphase transformer reactor (ITR).

SUMMARY OF THE INVENTION

The object of in an embodiment a method for controlling at least two three-phase power converters with asynchronous pulse-width modulation, each power converter being capable of delivering three power supply phases, each supply phase of each converter being controlled by an intersection pulse-width modulation control signal resulting from the intersection of a modulating signal and a carrier signal.

The method comprises a step in which, for each phase of each converter, the characteristics of the signals used to generate the modulating signal and carrier signal of each control signal of each phase of each converter are determined.

The method further comprises the following steps: For each converter, a phase shift is inserted between the carrier signals used to generate the phase control signals of the converter. For each phase, a phase shift is inserted between the carrier signals used to generate the control signals of the converters. For each phase of each converter, a pulse-width modulation control signal by intersection is determined resulting from the intersection of a modulating signal and a carrier signal, and the control signals are transmitted to the converters.

The control signal may be an asynchronous pulse-width modulation control signal derived from the intersection between a modulating signal and a first sawtooth carrier signal for the positive amplitudes of the modulating signal, and a second sawtooth carrier signal for the negative amplitudes of the modulating signal, where the modulating signal is derived from the sum of a fundamental signal and a third-harmonic signal, both of the sinusoidal type.

The control signal may be an asynchronous pulse-width modulation control signal derived from the intersection between a modulating signal and a first sawtooth carrier signal for the positive amplitudes of the modulating signal, and a second sawtooth carrier signal for the negative amplitudes of the modulating signal, where the modulating signal is derived from the sum of a sinusoidal signal and a square-wave signal, for which a phase shift is additionally inserted between the carrier signal and the square-wave signal for each control signal of each phase of each converter.

When two converters are controlled, the phase shift between the square-wave signal and carrier signal may be zero for the first phase, equal to p for the second phase and zero for the third phase for each of the converters.

When three converters are controlled, the phase shift between the square-wave signal and carrier signal may be zero for the first phase, equal to p for the second phase and zero for the third phase, for the first and third converters, and the phase shift between the square-wave signal and the carrier signal may be equal to p for the first phase, zero for the second phase and equal to p for the third phase for the second converter.

For each converter, the phase shift between the carrier signals used to generate the control signal of the first phase and the second phase control signal may be equal to 2p/3 and the phase shift between the carrier signals used to generate the control signal of the first phase and the control signal of the third phase may be equal to 4p/3.

When two converters are controlled for each phase, the phase shift of the carrier signal used to generate the control signal of the first converter and the phase shift of the carrier signal used to generate the control signal of the second converter may be equal to p.

When three converters are controlled for each phase, the phase shift of the carrier signal used to generate the control signal of the first converter and the phase shift of the carrier signal used to generate the control signal of the second converter can be equal to 2p/3 and the phase shift of the carrier signal used to generate the control signal of the second converter and the phase shift of the carrier signal used to generate the control signal of the third converter may also be equal to 2p/3.

BRIEF DESCRIPTION OF THE DRAWINGS

Other objects, characteristics and advantages of the invention will become apparent on reading the following description, given solely by way of a nonlimited example, with reference to the accompanying drawings, in which:

FIG. 8 shows a pair of power converters for implementation of an asynchronous three-phase pulse-width modulation (PWM) control method according to embodiments of the present invention.

DETAILED DESCRIPTION OF THE INVENTION

Figure 1:
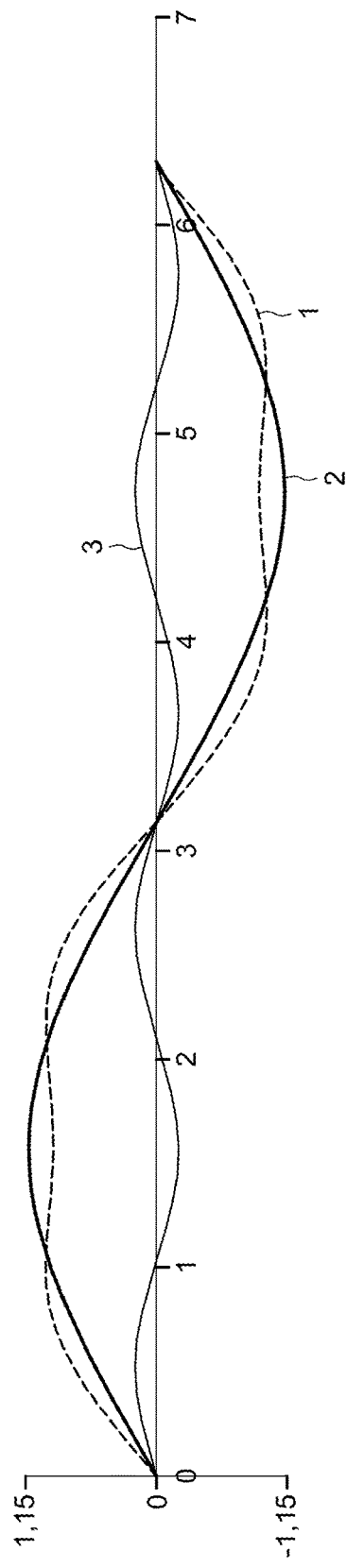
FIG. 1 shows a modulating signal of a PWM H3 signal for a phase of a power converter and its components.
Figure 2:
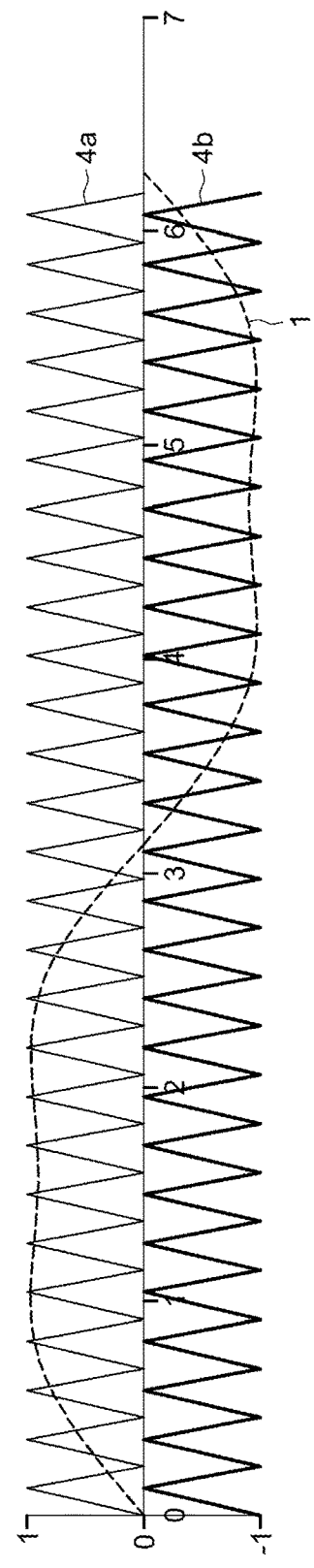
FIG. 2 shows the generation of the PWM signal by intersection of the modulating signal and carrier signals.
Figure 3:
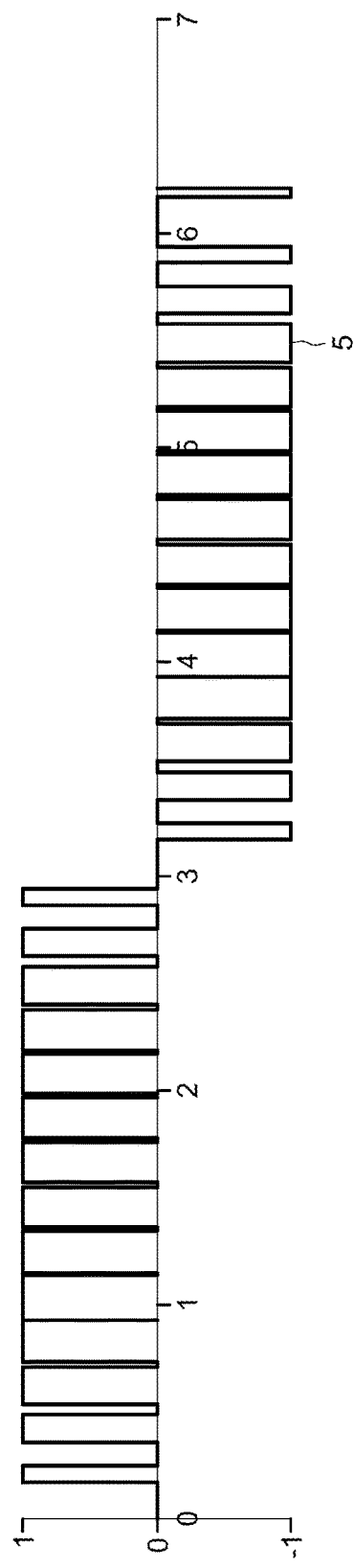
FIG. 3 shows the PWM H3 signal obtained.
Figure 4:
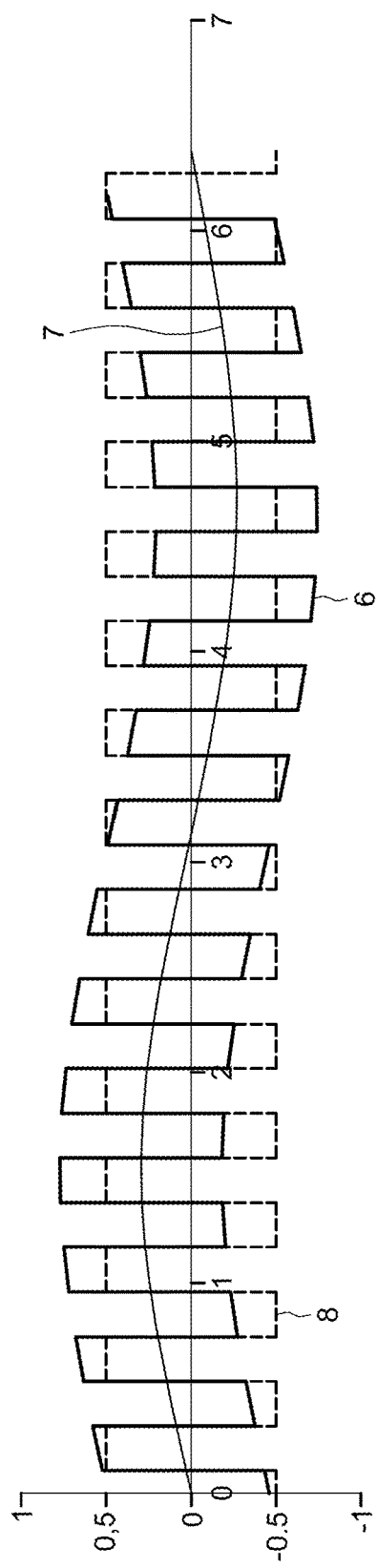
FIG. 4 shows a modulating signal of a PWM Toggle signal for a phase of a power converter and its components.
Figure 5:
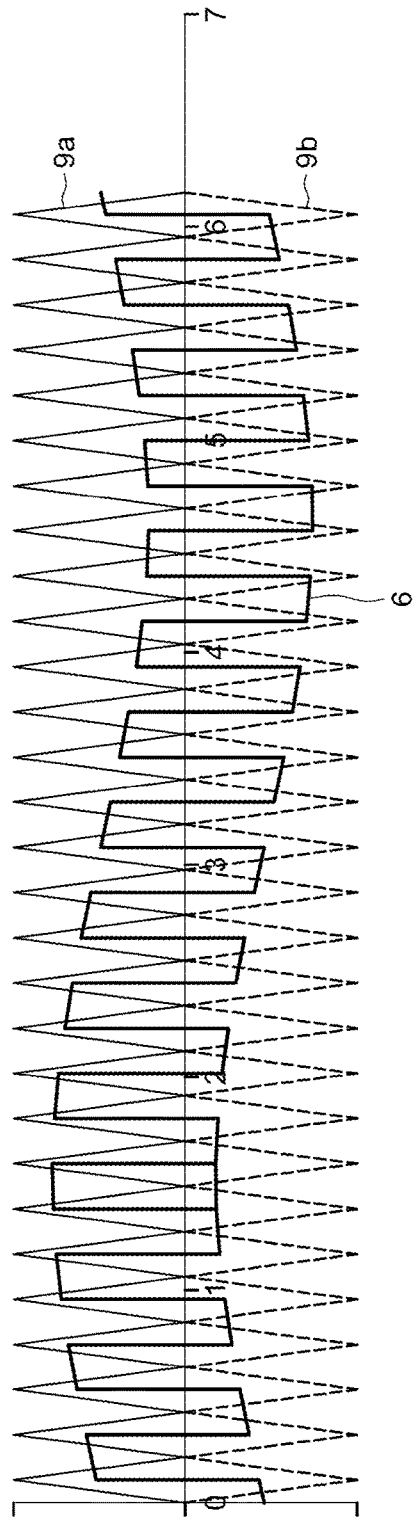
FIG. 5 shows the generation of the Toggle signal by intersection of the modulating signal and carrier signals.
Figure 6:
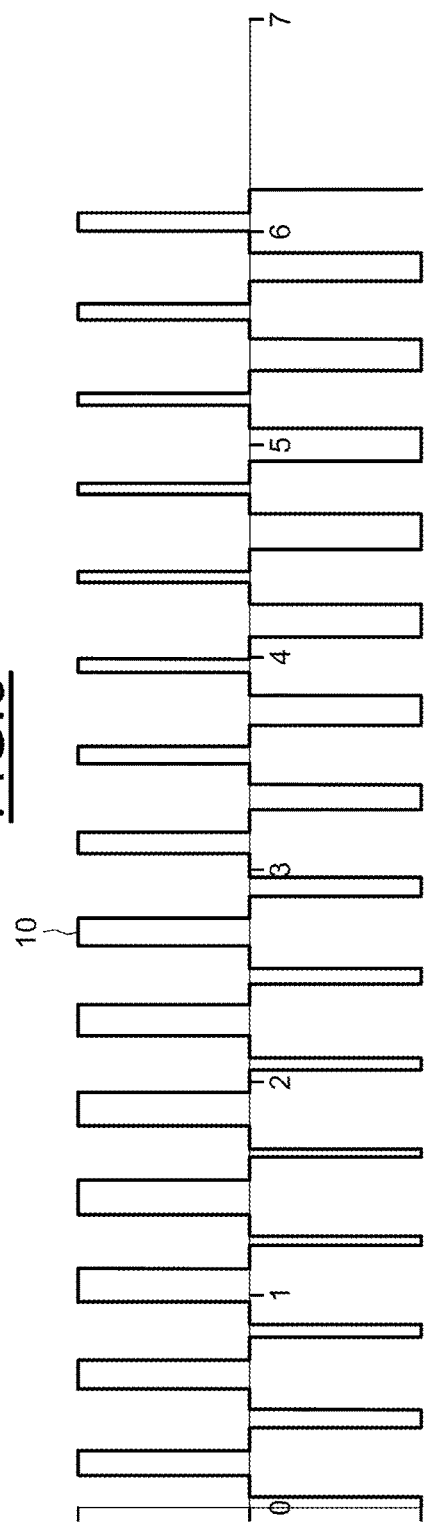
FIG. 6 shows the PWM Toggle signal obtained.

The control method according to in an embodiment an asynchronous three-phase pulse-width modulation (PWM) control method with at least two power converters (as described below with reference to FIGS. 7 and 8). The control signals thus generated have phase-shifted carrier signals between the phases U, V and W, making it possible to limit the differential harmonics and zero-sequence harmonics.

A first control signal is an asynchronous PWM three-phase control signal of the H3 type. A second control signal is an asynchronous PWM three-phase control signal of the Toggle type.

In the specific case of the PWM Toggle-type control signal, the signal processing also benefits from a new, so-called "Balanced" management of the homopolar signal summed with the fundamental signal to obtain the modulating signal. This management differs depending on the number of power converters controlled in parallel.

The PWM H3 and Toggle control signals are determined for each phase of each power converter. For these signals to allow the generation of their own current, the signals relating to each phase are phase-shifted.

For each phase of a converter, a phase shift of 2p/3 is inserted between the carrier signals of the adjacent phases (e.g. for a three-phase system U, V, W, the adjacent phases are the U and V phases or the V and W phases or the W and U phases).

In other words, the carrier signal of the U phase is at the frequency $F_{pwm}$, the carrier signal of the V phase is at the frequency $F_{pwm}$ phase-shifted by 2p/3 and the carrier signal of the W phase is at the frequency $F_{pwm}$ phase-shifted by 4p/3.

In the case of the Toggle PWM signals, a different modulation of the square-wave signal is inserted with regard to the carrier signal for the second power converter in addition to the modulation used for the first converter.

In the example defined in the introduction, with two three-phase converters generating three phases (U1, V1, W1) and (U2, V2, W2) respectively, taking the signal PWM Toggle of the phase U1 as a reference, the square-wave signal allowing the generation of the PWM Toggle signal is phase-shifted relative to the corresponding carrier signal by p for the phase V1, by 0 for the phase W1, by 0 for the phase U2, by p for the phase V2, and by 0 for the phase W.

When a plurality of power converters are controlled in parallel, an additional phase shift of the carrier signals relative to the first power converter is inserted with regard to the phase shifts of the other power converters. The phase shift in question depends on the number of converters. For example, it is equal to p for two converters, and is equal to 2p/3 for three converters and 2p/n for n converters.

As shown in FIG. 8, in the system 100, two three-phase power converters (first converter, second converter) 110a and 110b are employed each generating three phases (U1, V1,W1) and (U2,V2,W2). Each power supply phase (U1, V1, W1 and U2, V2, W2 of the first and second power converters 110a and 110b is controlled by a pulse-width modulation control signal 112. For each power converter 110a, 110b, a phase shift 120 is inserted between carrier signals 130 used to generate the phase control signals 140 of the converters 110a, 110b via a PWM signal generator 150. For each phase, a phase shift 120 is inserted between the carrier signals 130 used to generate the phase control signals 140 of the power converters 110a and 110b.

Thus, for each phase (U1, V1, W1) and (U2, V2, W2), an additional phase shift 120 of the carrier signals 130 is inserted relative to a second power converter 110b with regard to those of the first power converter 110a equal to p.

Thus, for a system 100 with two three-phase converters, taking the carrier signal of the phase U1 as a reference, there is a phase shift of 2p/3 for the carrier signal 130 of the phase V1, a phase shift of 4p/3 for the carrier signal 130 of the phase W1, a phase shift 120 of p for the carrier signal 130 of the phase U2, a phase shift 120 of 5p/3 for the carrier signal 130 of the phase V2 and a phase shift 120 of p/3 for the carrier signal 130 of the phase W2.

In addition, in the case of the PWM Toggle control signal, a specific phase shift is added between the square-wave signal and the corresponding carrier signal used to generate the control signals of the phases of the two power converters.

This specific phase shift is equal to p for each phase such that the square-wave signal of the phase U of the second converter is in phase opposition with the square-wave signal of the phase U of the first converter.

For a number of power converters different from that shown above, a different additional phase shift is used between the carrier signals relating to the first power converter compared to those of the other power converters.

For example, in the case of three power converters for the PWM H3 control signal, a phase shift of p/3 is used between the carrier signals of the phases of the second converter and those of the first converter, and a phase shift of 4p/3 is used between the carrier signals of the phases of the third converter and those of the first converter.

Still in the case of three power converters, for the PWM Toggle control signal, a specific phase shift is used between the square-wave signal and carrier signal which is zero for the first phase, equal to p for the second phase and zero for the third phase for the first and third converters, and a specific phase shift between the square-wave signal and the carrier signal may be equal to p for the first phase, zero for the second phase and equal to p for the third phase for the second converter.

Such a phase shift of the square-wave signals has the advantage of balancing the zero-sequence components between the phases of the power converters.

Figure 7:
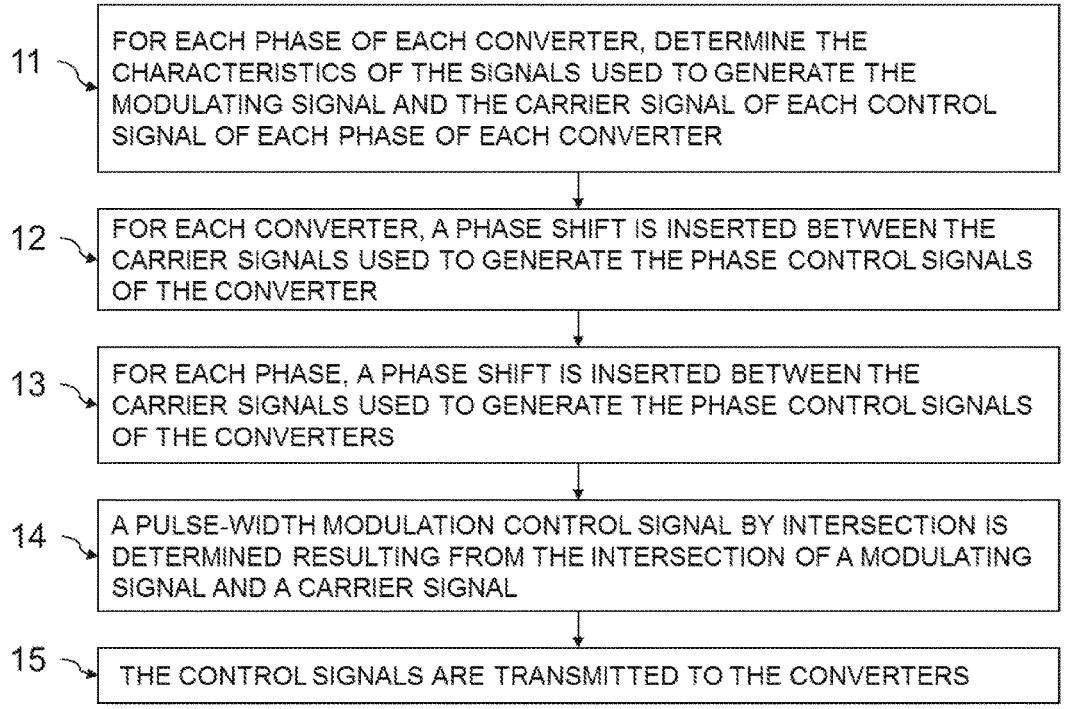
FIG. 7 shows the principal steps of a control method.

The method for controlling at least two three-phase power converters with asynchronous pulse-width modulation is shown in FIG. 7.

During a first step 11, for each phase of each converter, we determine the characteristics of the signals used to generate the modulating signal and the carrier signal of each control signal of each phase of each converter, as described in the prior state of the art, in particular for signals of the H3 and Toggle types.

During a second step 12, for each converter, a phase shift is inserted between the carrier signals used to generate the phase control signals of the converter.

During a third step 13, for each phase, a phase shift is inserted between the carrier signals used to generate the phase control signals of the converters.

During a fourth step 14, a pulse-width modulation control signal by intersection is determined resulting from the intersection of a modulating signal and a carrier signal.

During a fifth step 15, the control signals are transmitted to the converters.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for controlling at least two three-phase power converters with asynchronous pulse-width modulation, wherein each power converter is capable of delivering three power phases, each power phase of each power converter is controlled by a pulse-width modulation control signal by intersection resulting from the intersection of a modulating signal and a carrier signal, and the method further comprises:

for each phase of each converter, determining a type of signals used to generate the modulating signal and the carrier signal of each pulse-width modulation control signal of each phase of each converter, for each converter, inserting a first phase shift between the carrier signals used to generate the pulse-width modulation control signal for each phase, for each phase, inserting a second phase shift between the carrier signals used to generate the pulse-width modulation control signals of the converters, for each phase of each converter, determining the pulse-width modulation control signal by intersection resulting from the intersection of the modulating signal and the carrier signal, and transmitting the pulse-width modulation control signals to the converters;

wherein the pulse-width modulation control signal is an asynchronous impulse modulation control signal which is derived from the intersection between the modulating signal and a first sawtooth carrier signal for a positive amplitudes of the modulating signal, and a second sawtooth carrier signal for a negative amplitudes of the modulating signal, wherein the modulating signal is derived from a sum of a sinusoidal signal and a square-wave signal, and a third phase shift is inserted between the carrier signal and the square-wave signal for each pulse-width modulation control signal of each phase of each converter.

2. The method according to claim 1 wherein, when two converters are controlled, the third phase shift between the square-wave signal and carrier signal is zero for the first phase, equal to $\pi$ for the second phase and zero for the third phase for each of the converters.

3. The method according to claim 1 wherein, when three converters are controlled, the third phase shift between the square-wave signal and carrier signal is zero for the first phase, equal to $\pi$ for the second phase and zero for the third phase for the first and third converters, and the third phase shift between the square-wave signal and the carrier signal is equal to $\pi$ for the first phase, zero for the second phase and equal to $\pi$ for the third phase for the second converter.

4. The method according to claim 1 wherein, for each converter, the first phase shift between the carrier signals used to generate the control signal of the first phase and the second phase control signal is equal to $2\pi/3$ and the first phase shift between the carrier signals used to generate the control signal of the first phase and the control signal of the third phase is equal to $4\pi/3$.

5. The method according to claim 1 wherein, when two converters are controlled for each phase, the second phase shift of the carrier signal used to generate the control signal of the first converter and the second phase shift of the carrier signal used to generate the control signal of the second converter is equal to $\pi$.

6. The method according to claim 1 wherein, when three converters are controlled for each phase, the second phase shift of the carrier signal used to generate the control signal of the first converter and the second phase shift of the carrier signal used to generate the control signal of the second converter is equal to $2\pi/3$ and the second phase shift of the carrier signal used to generate the control signal of the second converter and the second phase shift of the carrier signal used to generate the control signal of the third converter is also equal to $2\pi/3$.

\* \* \* \* \*